Feb. 17, 1931.  G. H. PHELPS  1,793,245
INDICATING ELECTRIC WELDING AND SIMILAR OPERATIONS
Original Filed Oct. 3, 1921  2 Sheets-Sheet 1
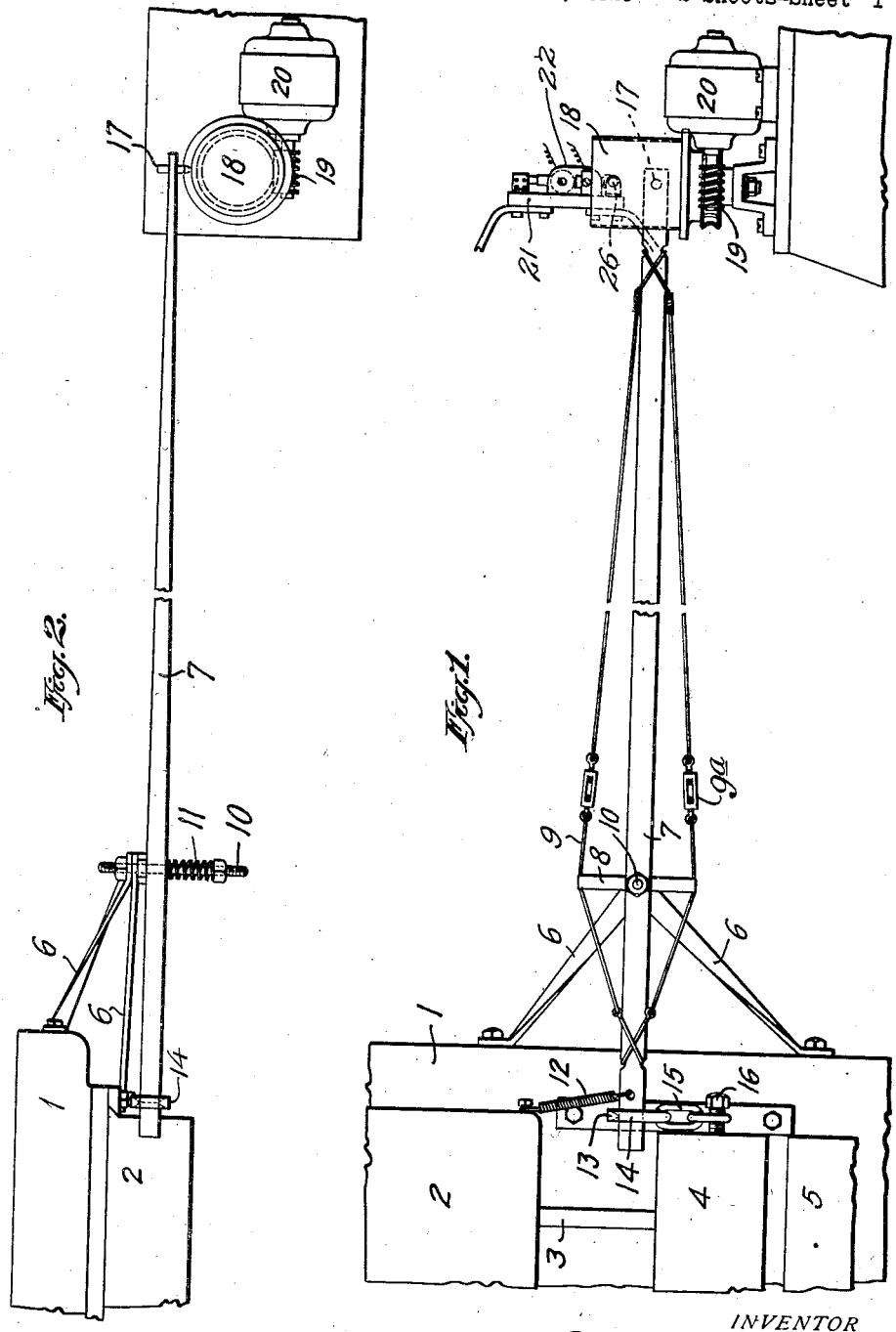
INVENTOR
George H. Phelps
BY
D. Anthony Usina, ATTORNEY

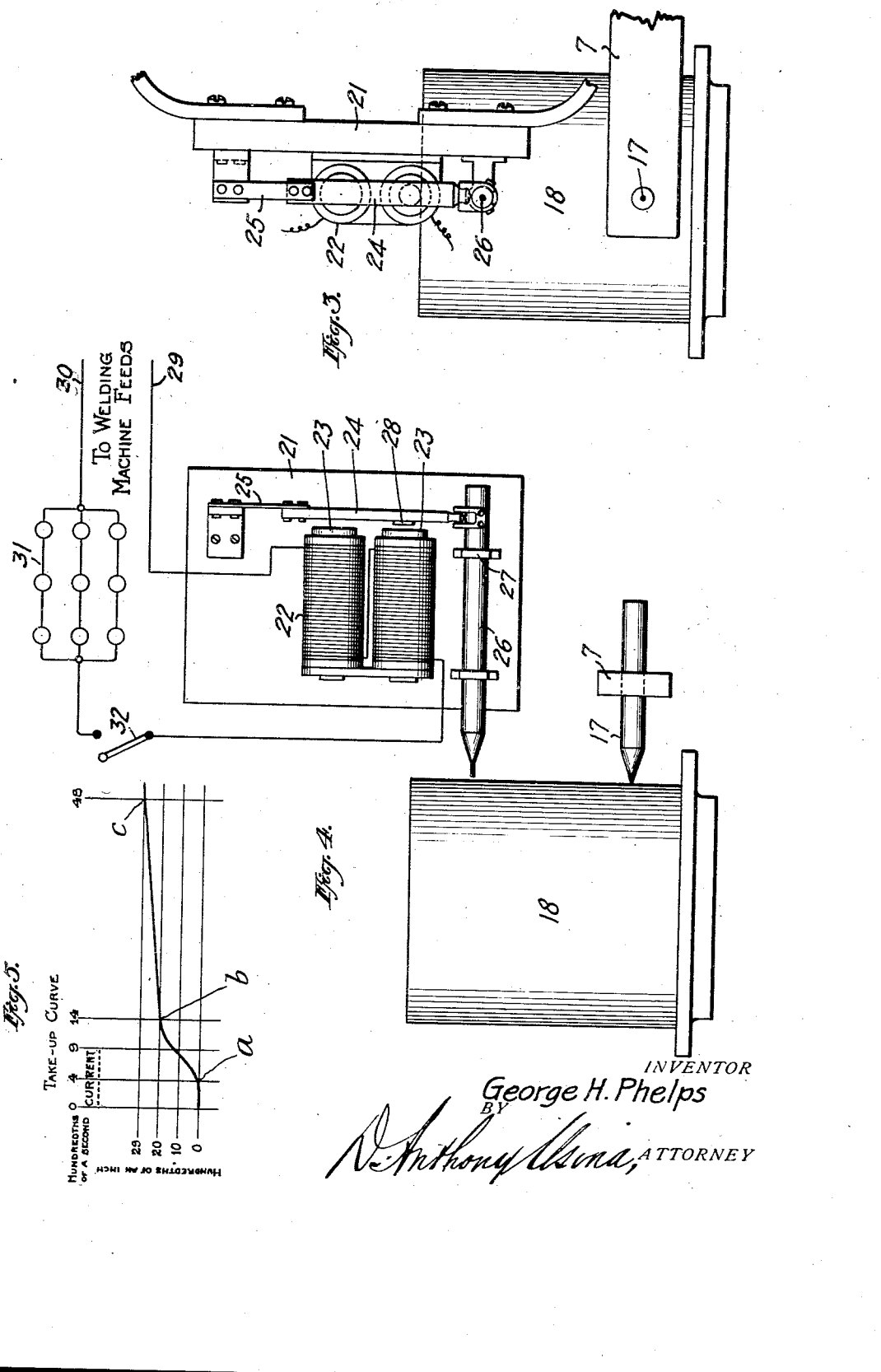

Patented Feb. 17, 1931

1,793,245

UNITED STATES PATENT OFFICE

GEORGE H. PHELPS, OF WAREHOUSE POINT, CONNECTICUT, ASSIGNOR, BY MESNE ASSIGNMENTS, TO METROPOLITAN ENGINEERING COMPANY, A CORPORATION OF NEW YORK

INDICATING ELECTRIC WELDING AND SIMILAR OPERATIONS

Application filed October 3, 1921, Serial No. 505,140. Renewed December 31, 1925.

In a prior patent of Thomas E. Murray, Jr., No. 1,281,636 dated October 15, 1918, there is described a method of welding metal parts together by forcing them together while passing a current of extremely high amperage for a brief period of time, as for example, for a fraction of a second.

The present invention is directed to the indicating of such a welding operation and similar operations in electric welding, riveting or upsetting of metal. The extreme rapidity of such operations makes it practically impossible to determine by direct observation the conditions prevailing at the successive stages.

By my present invention I have made it possible to analyze the operation and to determine conditions and methods of regulation by which good results can be uniformly obtained.

The accompanying drawings illustrate an embodiment of the invention.

Fig. 1 is a side elevation of the indicator applied to a welding machine;

Fig. 2 is a plan of the same with the current indicator and other parts removed;

Fig. 3 is an elevation, from the opposite side, of the recording end of the apparatus;

Fig. 4 is a side elevation of the parts in Fig. 3, with the electric circuit indicated;

Fig. 5 is a diagram or "card" produced by the machine.

Referring to the embodiment illustrated, the frame of the machine is indicated at 1, 2, a powerful electric magnet being carried in the part 2 and actuating a pressure rod 3 which forces down a moving electrode 4. The parts to be welded, not shown, are carried respectively by the movable electrode 4 and the lower fixed electrode 5.

A bracket 6 extending from the frame of the machine carries a pivoted arm 7 which communicates to a marker on its outer end the movement of the electrode 4, multiplying such movement to an extent depending on the length of the arm, which may be any desired amount. The parts to be welded are in contact with each other before the operation begins, so that the movement of the electrode 4 corresponds to the take-up; the rate of which varies in successive fractional intervals of time. Struts 8 and wires 9 form trusses to stiffen the arm 7 so as to reduce the vibration thereof in a vertical plane. Turnbuckles 9ª are used to adjust the tension in the wires. The pivot 10 carries a spring 11 compressed by a nut on the pivot and bearing against the arm 7 so as to reduce vibration in the lateral direction.

The inner end of the arm 7 is pulled upward by a spring 12 and is engaged on its upper side by a knife edge 13 of a link 14 which is connected by a chain or other flexible connection 15 to a stud 16 fastened to the end of the movable electrode. The movement to be indicated is entirely in one direction, downward with the electrode 4, so that the inner end of the indicator arm is moved at the same rate as the take-up throughout the welding operation.

At its outer end the indicator arm 7 carries a pencil or other marker 17 which bears against a record sheet carried on a drum 18 mounted on a vertical pivot. During an indicating operation the drum is rotated by a worm 19 driven from an electric motor 20. The marker 17 bearing against the record sheet will move upward during an operation, as the drum is rotated, and will trace a curve corresponding to the take-up. The time intervals corresponding to the take-up at different points may be determined from the known speed of revolution of the drum. During the passage of the electric current, however the apparatus provides a simpler and more accurate determination of time intervals and at the same time indicates the beginning and end of the current and the intervals in the passing of the same. For this purpose I use the mechanism shown in Figs. 3 and 4.

On the base 21 mounted on brackets adjacent to the drum is carried a pair of coils 22 with soft iron cores 23, the ends of which face a vibrating arm 24 supported from a spring 25. The lower end of the vibrator 24 engages a bracket on a pencil 26 mounted to slide in brackets 27 mounted on the base 21. The vibrator is provided with a non-magnetic plate or slug 28 which strikes the adjacent core 23 to limit the movement of the arm and to keep the latter insulated from the core.

The current passes in from the welding machine feed wires 29 and 30 to and through the coils 22. In the wire 30 is inserted a set of lamps or other resistance 31; also a switch 32 by which the current indicator may be disconnected and rendered inoperative. The spring 25 holds the vibrator 24 out and holds the marker 26 away from the recording sheet on the drum. When the current passes the vibrator is pulled toward the coils and the marker is held in contact with the moving record sheet as long as the current continues; and when the current is stopped the marker is drawn away from the sheet.

For this welding operation I use a cyclic current, generally an alternating current. The current through the coils 22 will have a maximum value twice, and will pass through zero value twice, for each cycle of alternating current. The marker 26 will then make two separate dots or short dashes on the recording sheet. Knowing the number of cycles I can readily calculate the time interval represented on the sheet by each of the dashes made by the marker. For a fifty cycle current, for example, each dash will represent 1/100 of a second.

In using the indicator, I first attach the inner end of the arm 7 to the moving electrode and revolve the drum with the take-up marker 17 in contact therewith, and this gives us the zero line for the take-up. Upon performing a welding operation, continuing the rotation of the drum, a take-up curve will be indicated on the recording sheet like the heavy line shown in Fig. 5. Knowing the rate of revolution of the drum I can draw verticals from the zero line at intervals corresponding to periods of time and can thus co-ordinate the take-up as its rate varies at successive points with the progress of time during the operation.

By this method, the curve in Fig. 5 shows that there was no substantial take-up until the fourth hundredth of a second; that the greater part of the take-up, indicated by the line $a$, $b$, occurred between the fourth and fourteenth hundredth, quite rapidly; and that from this point to the end there was a comparatively slow and regular take-up. It must be realized, however, that a (small) part of this last movement, represented by $b$, $c$, was probably due to contraction of the metal on cooling, with the pressure maintained on the electrode and the metal parts.

If it be desired to indicate the current for the same welding operation, the switch 32 is closed before the operation commences. Then the beginning of the welding current and the continuation thereof are indicated by the broken line shown in Fig. 5; each dash in this line representing the passage of the current for a time interval corresponding to half a cycle. This current indication, co-ordinated with the take-up line shows that the current for this particular case was cut off at about half the take-up. Cards taken in this way under various conditions have served to indicate the best length of time for the current, and other circumstances which will secure the best results and will secure uniformity.

Though I have described with great particularity of detail a certain embodiment of my invention, yet it is not to be understood therefrom that the invention is restricted to the particular embodiment disclosed. Various modifications in detail and in the arrangement of the parts may be made by those skilled in the art without departure from the invention as defined in the following claims.

What I claim is:

1. An indicator for electric welding and similar operations in which a current of extremely high amperage is used and the metal is taken up by pressure in a very brief period of time, said indicator including in combination means controlled by the welding circuit for indicating successive fractional intervals of said period and means for simultaneously indicating the extent of the take-up for such fractional intervals.

2. An indicator for electric welding and similar operations in which a current of extremely high amperage is used and the metal is taken up by pressure in a very brief period of time, said indicator including in combination means controlled by the welding mechanism for indicating the progress of the take-up and means controlled by the welding circuit for simultaneously indicating the cycles of the current.

3. An indicator for electric welding and similar operations in which a current of extremely high amperage is used and the metal is taken up at a varying rate by pressure in a very brief period of time, said indicator including in combination means for indicating the varying progress of the take-up and means for simultaneously indicating the cycles of the current and co-ordinating these with the take-up.

4. In an indicator for electric welding and similar operations in which a current of extremely high amperage is used and the metal is taken up by pressure in a very brief period of time, the combination of means for indicating the progress of the take-up and means for simultaneously indicating the cycles of the current and for co-ordinating the beginning and end of the current and the cycles thereof with the take-up.

5. A recorder for electric welding and similar operations in which a cyclic current is used and the operation progresses at a varying rate, including in combination a recording sheet, a marker adapted to engage said sheet, means for effecting a relative movement between the sheet and the marker and a marker-operating device actuated by said current in cycles corresponding to those of said current, and means for simultaneously recording on said sheet the varying progress of the welding operation.

6. A recorder for electric welding and similar operations in which a cyclic current is used and is cut off before the end of the welding operation including in combination a recording sheet, a marker adapted to engage said sheet, means for effecting a relative movement between the sheet and the marker, and a marker-operating device actuated by said current in cycles corresponding to those of said current, and means for recording on said sheet the progress of the welding operation during and after the passage of the welding current.

7. A recorder for electric welding and similar operations in which a cyclic current is used including in combination a recording sheet, a marker normally held out of contact with the sheet, means for effecting a relative movement between the sheet and the marker, and a marker-operating device actuated by said current in cycles corresponding to those of said current and moving the marker into engagement with the moving sheet so as to form thereon a succession of separate marks corresponding with said cycles.

8. A recorder for electric welding and similar operations with a varying rate of take-up with the metal including in combination a recording sheet, a marker adapted to engage said sheet, means for effecting a relative movement between the sheet and the marker, a marker-operating device actuated by the current for causing the marker to indicate the current on the recording sheet and means for simultaneously indicating also the varying progress of the take-up of metal.

9. A recorder for electric welding and similar operations in which a cyclic current is used including in combination a recording sheet, and a marker normally held out of contact with the sheet and actuated by the current in cycles corresponding to those of the current for making on the sheet a succession of separate marks.

10. In an indicator for electric welding and similar machines, the combination of means controlled by the welding devices for indicating the progress of the operation and means controlled by the welding current for simultaneously indicating the passage of such current and co-ordinating the beginning and end of such current with the progress of the operation.

11. A recorder for electric welding and similar operations in which a current is passed between the parts while they are pressed together to take up metal, including in combination a recording sheet, a pair of markers one for recording the passage of the current and the other for recording the progress of the take-up and means for effecting a relative longitudinal movement between the sheet and the markers and a relative transverse movement between the sheet and the take-up marker.

12. In a machine for electric welding and similar operations in which the take-up of metal progresses at a varying rate, the combination of a carrier for a recording sheet, a marker adapted to engage said sheet, means for effecting a relative movement between the sheet and the marker, and a marker-operating device actuated by a part of the machine which moves in accordance with the varying progress of the take-up of metal.

In witness whereof, I have hereunto signed my name.

GEORGE H. PHELPS.